United States Patent [19]

Tjon-Joe-Pin

[11] Patent Number: 5,201,370
[45] Date of Patent: Apr. 13, 1993

[54] ENZYME BREAKER FOR GALACTOMANNAN BASED FRACTURING FLUID

[75] Inventor: Robert M. Tjon-Joe-Pin, Houston, Tex.

[73] Assignee: BJ Services Company, Houston, Tex.

[21] Appl. No.: 842,038

[22] Filed: Feb. 26, 1992

[51] Int. Cl.$^5$ .............................................. E21B 43/26
[52] U.S. Cl. .................................. 166/300; 166/308; 252/8.551
[58] Field of Search ....................... 166/281, 300, 308; 252/8.551

[56] References Cited

U.S. PATENT DOCUMENTS 2,681,704  6/1954  Menaul .......................... 166/308 X
2,801,218  7/1957  Menaul .......................... 166/308 X Primary Examiner—George A. Suchfield
Attorney, Agent, or Firm—Charles D. Gunter, Jr.; Charles D. Gunter, Jr.

[57] ABSTRACT

A method of fracturing a subterranean formation in a well bore is shown in which a gellable fracturing fluid is first formed by blending together an aqueous fluid, a hydratable polymer, a suitable cross-linking agent for cross-linking the hydratable polymer to form a polymer gel and an enzyme breaker. The cross-linked polymer gel is pumped into the well bore under sufficient pressure to fracture the surrounding formation. The enzyme breaker is allowed to degrade the cross-linked polymer with time to reduce the viscosity of the fluid so that the fluid can be pumped from the formation back to the well surface. The particular enzyme breaker utilized has an activity in the range from about 2.0 to 11.0 and is effective to attack only specific linkages in the cross-linked polymer gel.

7 Claims, No Drawings

ENZYME BREAKER FOR GALACTOMANNAN BASED FRACTURING FLUID

BACKGROUND OF THE INVENTION

1. Field of the Invention

The present invention relates to gelled fracturing fluids of the type used in well bore operations and particularly to a method for producing a gradual reduction in the viscosity of a gelled fracturing fluid through the use of enzymes incorporated in the gelled fluid.

2. Description of the Prior Art

During hydraulic fracturing, a sand laden fluid is injected into a well bore under high pressure. Once the natural reservoir pressures are exceeded, the fracturing fluid initiates a fracture in the formation which generally continues to grow during pumping. The treatment design generally requires the fluid to reach maximum viscosity as it enters the fracture which affects the fracture length and width. This viscosity is normally obtained by the gellation of suitable polymers, such as a suitable polysaccharide. The gelled fluid can be accompanied by a propping agent which results in placement of the propping agent within the fracture thus produced. The proppant remains in the produced fracture to prevent the complete closure of the fracture and to form a conductive channel extending from the well bore into the formation being treated once the fracturing fluid is recovered.

The recovery of the fracturing fluid is accomplished by reducing the viscosity of the fluid to a low value such that it flows naturally from the formation under the influence of formation fluids and pressure. This viscosity reduction or conversion is referred to as "breaking" and can be accomplished by incorporating chemical agents, referred to as breakers, into the initial gel.

In addition to the importance of providing a breaking mechanism for the gelled fluid to facilitate recovery of the fluid, the timing of the break is also of great importance. Gels which break prematurely can cause suspended proppant material to settle out of the gel before being introduced a sufficient distance into the produced fracture. Premature breaking can also result in a premature reduction in the fluid viscosity resulting in a less than desirable fracture length in the fracture being created.

On the other hand, gelled fluids which break too slowly can cause slow recovery of the fracturing fluid from the produced fracture with attendant delay in resuming the production of formation fluids. Additional problems can result, such as the tendency of proppant to become dislodged from the fracture, resulting in at least partial closing and decreased efficiency of the fracturing operation.

For purposes of the present application, premature breaking will be understood to mean that the gel viscosity becomes diminished to an undesirable extent before all of the fluid is introduced into the formation to be fractured.

Optimally, the fracturing gel will begin to break when the pumping operations are concluded. For practical purposes, the gel should be completely broken within a specific period of time after completion of the fracturing period. At higher temperatures, for example, about 24 hours is sufficient. A completely broken gel will be taken to mean one that can be flushed from the formation by the flowing formation fluids or that can be recovered by a swabbing operation. In the laboratory setting, a completely broken, non-crosslinked gel is one whose viscosity is either about 10 centipoises or less as measured on a Model 50 Fann viscometer R1/B1 at 300 rpm or less than 100 centipoises by Brookfield viscometer spindle #1 at 0.3 rpm.

By way of comparison, certain gels, such as those based upon guar polymers, undergo a natural break without the intervention of chemical additives. The break time can be excessively long, however. Accordingly, to decrease the break time of gels used in fracturing, chemical agents are incorporated into the gel and become a part of the gel itself. Typically, these agents are either oxidants or enzymes which operate to degrade the polymeric gel structure.

However, obtaining controlled breaks using various chemical agents, such as oxidants or enzymes, has proved difficult. Common oxidants are ineffective at low temperature ranges from ambient temperature to 130° F. The common oxidants require either higher temperatures to cause homolytic cleavage of the peroxide linkage or a coreactant to initiate cleavage. Common oxidants do not break the polysaccharide backbone into monosaccharide units. The breaks are nonspecific, creating a mixture of macromolecules. Further, common oxidants are difficult to control. They react with things other than the polymeric gel. Oxidants can react, for example, with the tubing and linings used in the oil industry as well as resins on resin coated proppants.

Using enzymes for controlled breaks circumvents the oxidant temperature problems. The enzymes are effective at the lower temperatures. The commonly known enzymes, however, are non-specific mixtures that are sensitive to higher pH which causes other problems. Enzymatic activity rapidly declines after exceeding pH 8.0 and denatures above pH 9.0. In the case of borate cross-linked guar gels, the gels are also pH dependant requiring pH in excess of 8.0 to initiate gellation. As the pH increases, the resulting gel becomes stronger, often requiring less borate crosslinker. Normally, when enzymes are used with borate crosslinked fluids these gels are buffered to maintain a pH range of 8.2 to 8.5 to ensure both gellation and enzymatic degradation. This technique requires high concentrations of both borate and enzyme. Unfortunately, while ensuring good breaks, the initial gel stability and proppant transport capability is weakened. The determination of the optimum enzyme concentration is a compromise between initial gel stability and an adequate break.

In the prior art systems, enzymatic degradation of the polymer improves at a lower pH range. By introducing another substance to the fracturing fluid, the pH can be raised for gellation, then lowered for enzymatic degradation. See, for instance, U.S. Pat. No. 5,067,566. This pH-regulating substance, for example, a low molecular weight ester, slowly hydrolyzes to produce a Bronsted acid, thereby dropping the pH of the fracturing fluid.

This technique, however, requires the introduction of another substance to the fracturing fluid. Adequate degradation depends on adequate hydrolysis of this pH-regulating substance. If distribution is uneven, the degradation may vary on local conditions within the gel.

Another problem with the lower pH ranges required for enzyme activation concerns proppant transport. Maximum proppant transport requires more alkaline pH levels. Higher pH levels increase the viscosity of the fluid during proppant transport than at a lower pH level. A higher viscosity keeps the cracks within the subterranean formation open better.

Conventional enzyme breaker systems generally degrade the gel polymers inadequately. These enzymes, for example, the cellulases, hemi-cellulases, amylases, pectinases, and their mixtures are familiar to those in the well service industry. These enzymes break the bonds that connect the monosaccharides into a polysaccharide backbone, for instance, the 1,4-α-D-galactosiduronic linkages in pectin. These conventional enzyme breaker systems are nonspecific and cause random breaks. As a result, these prior art enzyme systems only partially degrade the polysaccharide polymer. Instead of fragmenting almost completely into much smaller fragments such as monosaccharides, the enzymes break the polysaccharide gel into larger fragments consisting of a mixture of disaccharides, oligosaccharides and polysaccharides. These larger gel fragments have been shown to cause residue problems in the fractured formation once the fracturing operation is complete. Such residue decreases productivity by restricting the flow of fluid and plugging the formation.

The present invention has as its object to provide a break mechanism for a gelled fracturing fluid which yields high initial viscosity with little change during pumping but which produces a rapid break in the gel after pumping is completed to allow immediate recovery of the fluid from the formation.

Another object of the invention is to provide a gel system for a well fracturing operation which can break the gel polymers within a wide range of pH at low to moderate temperatures without interfering with the crosslinking chemistry.

Another object of the invention is to provide an enzyme breaker system which breaks the crosslinked polymer backbone into principally monosaccharide and disaccharide fragments.

Another object of the invention is to provide a gel breaker which does not require a mechanism to shift the pH for the desired enzyme breaker activity, allowing the pH to remain at higher levels for proppant transport.

Another object of the invention is to provide an enzyme breaker system for a gelled fracturing fluid which produces a controlled break over a wide pH range and at low temperatures and which decreases the amount and size of residue left in the formation after recovery of the fluid from the formation.

SUMMARY OF THE INVENTION

In the method of the invention, a gellable fracturing fluid is formulated by blending together an aqueous fluid, a hydratable polymer, which is capable of forming a polymer gel and an enzyme breaker which is effective to degrade the polymer gel at temperatures between about 50° F. to 180° F. and at pH's between about 2.0 to 11.0.

Preferably, the gellable fracturing fluid is formulated by blending together an aqueous fluid, a hydratable polymer, a crosslinking agent for crosslinking the hydratable polymer and an enzyme breaker. The fluid is then pumped to a desired location within the well bore under sufficient pressure to fracture the surrounding subterranean formation. Thereafter, the enzyme breaker degrades the polymer, whereby the fluid can be pumped from the subterranean formation to the well surface. The enzyme breaker has activity in the pH range of about 2.0 to 10.0 and is effective to attack only specific linkages in the cross-linked polymer gel.

Preferably, the hydratable polymer is selected from the group consisting of guars and derivatized guars. The preferred enzyme breaker is a hydrolase.

In a particularly preferred method for practicing the invention, the gellable fracturing fluid is formulated by blending together an aqueous fluid, a hydratable guar polymer having repeating units of mannose and galactose, a suitable crosslinking agent for crosslinking the hydratable polymer to form a polymer gel and an enzyme breaker. The pH of the blended fluid is raised above about 9.0 to 10.5 and the cross-linked fluid is pumped to a desired location in the well bore to fracture the formation. The enzyme breaker then reduces the viscosity of the fluid, whereby the fluid can be pumped from the subterranean formation back to the well surface. The enzyme breaker has activity in the pH range of about 2.0 to 11.0, the activity being specific to attack the mannosidic and galactomannosidic linkages of the cross-linked polymer gel to reduce the polymer to a solution of mostly monosaccharide units. Under some conditions the enzyme breaker completely reduces the cross-linked polymer to a solution of monosaccharide units.

Additional objects, features and advantages will be apparent in the written description that follows.

DETAILED DESCRIPTION OF THE INVENTION

In order to practice the method of the invention, an aqueous fracturing fluid is first prepared by blending a hydratable polymer into an aqueous fluid. The aqueous fluid could be, for example, water, brine, aqueous based foams or water-alcohol mixtures. Any suitable mixing apparatus may be used for this procedure. In the case of batch mixing, the hydratable polymer and the aqueous fluid are blended for a period of time which is sufficient to form a hydrated solution. The hydratable polymer useful in the present invention can be nay of the hydratable polysaccharides having galactose or mannose monosaccharide components and are familiar to those in the well service industry. These polysaccharides are capable of gelling in the presence of a crosslinking agent to form a gelled based fluid. For instance, suitable hydratable polysaccharides are the galactomannan gums, guars and derivatized guars. Specific examples are guar gum and guar gum derivatives. The preferred gelling agents are guar gum, hydroxypropyl guar and carboxymethyl hydroxypropyl guar. The most preferred hydratable polymers for the present invention are guar gum and carboxymethyl hydroxypropyl guar and hydroxypropyl guar.

The hydratable polymer is added to the aqueous fluid in concentrations ranging from about 0.12% to 0.96% by weight of the aqueous fluid. The most preferred range for the present invention is about 0.3% to about 0.48% by weight.

In addition to the hydratable polymer, the fracturing fluids of the invention include a crosslinking agent. The crosslinking agent can be any of the conventionally used crosslinking agents which are known to those skilled in the art. For instance, in recent years, gellation of the hydratable polymer has been achieved by crosslinking these polymers with metal ions including aluminum, antimony, zirconium and titanium containing compounds including the so-called organotitinates. See, for instance, U.S. Pat. No. 4,514,309. Recent research indicates that guar gels, which are crosslinked by the additions of borate ion donating materials, clean up faster and yield higher sand pack permeability than guar gels crosslinked with other crosslinking agents. As a result, the borate crosslinking agents are preferred.

In the case of the borate crosslinkers, the crosslinking agent is any material which supplies borate ions in solution. Thus the crosslinking agent can be any convenient source of borate ions, for instance the alkali metal and the alkaline earth metal borates and boric acid. A preferred crosslinking additive is sodium borate decahydrate. This crosslinking additive is preferably present in the range from about 0.024% to in excess of 0.18% by weight of the aqueous fluid. Preferably, the concentration of crosslinking agent is in the range from about 0.024% to about 0.09% by weight of the aqueous fluid.

Propping agents are typically added to the base fluid prior to the addition of the crosslinking agent. Propping agents include, for instance, quartz sand grains, glass and ceramic beads, walnut shell fragments, aluminum pellets, nylon pellets, and the like. The propping agents are normally used in concentrations between about 1 to 18 pounds per gallon of fracturing fluid composition, but higher or lower concentrations can be used as required. The base fluid can also contain other conventional additives common to the well service industry such as surfactants, and the like.

Breakers commonly used in the industry for this application include chemical oxidizers such as persulfates and enzymes such as hemicellulase, undefined enzyme mixtures derived from bacterial extracts, and the like. Breaker enzymes can be in the form of either a liquid or a powder which is activated by contact with the aqueous fluid.

Unlike the breaker systems of the prior art, the enzyme breakers of the invention are hydrolases that are stable in the pH range of about 2.0 to 11.0 and remain active at a pH above about 8.0. These same enzymes are active at low to moderate temperatures of about 50° F. to 180° F. The enzyme breakers are specific to hydrolyze greater than 90% of the guar polysaccharide backbone. The enzymes attack the mannosidic and galactomannosidic linkages in the guar backbone, breaking the backbone into monosaccharide and disaccharide fragments. Under some conditions, the enzymes break the polysaccharide backbone completely into monosaccharide fragments. The preferred enzymes are galactomannan hydrolases collectively called galactomannanase and they specifically hydrolyze the 1,6-α-D-galactomannosidic and the 1,4-β-D-mannosidic linkages between the monosaccharide units in the guar backbone respectively. The preferred galactomannanase is commercially available from Novo Nordisk of Norway as "Gammanase 1.5 L." The preferred concentration of galactomannanase is a 1:2 (weight/weight [w/w]) solution of 1,6-α-D-galactosidase and mannan endo-1,4-β-D-mannosidase, the galactomannanase being present in the range from about 0.001 to 0.004% by weight, based on the total weight of aqueous fluid. Unexpectedly, this combination of enzymes without any other enzymes or oxidants produces the above mentioned results. Adding other enzymes or oxidants to this system substantially decreases the effect of the enzyme breakers of the invention or the gel.

In the preferred method of the invention, the pH of the guar based gel fluid is first raised above about 8 to 11 through the use of a suitable buffer. Preferably, the gel pH is increased above about 9.0 which enhances gel strength. The optimum pH range is from about 9.0 to 10.0. Any conventional buffer or base can be used to adjust the pH, for instance aqueous potassium carbonate or sodium hydroxide respectively.

In a typical fracturing operation, the fracturing fluid of the invention is pumped at a rate sufficient to initiate and propagate a fracture in the formation and to place propping agents into the fracture. A typical fracturing treatment would be conducted by hydrating a 0.24% to 0.72% (weight/volume [w/v]) galactomannan based polymer, such as guar, in a 2% (w/v) KCl solution at a pH ranging from about 8.9 to 10.0. During the actual pumping, as described, the pH is raised by the addition of a buffer to above 9.0, followed by the addition of the enzyme breaker, crosslinking agent, proppant and other additives if required.

Although the preferred method of the invention uses pH ranges above about 9.0 with borate crosslinkers, the invention is not limited to this system. The following examples illustrate that the enzyme breaker system is effective in the preferred system and remains effective at acid pH ranges using a different crosslinker.

The following terms are defined as follows:
ppt=pounds per thousand
gpt=gallons per thousand gallons aqueous fluid
1IHU=International Hemicellulose Unit which equals the amount of enzyme that hydrolyzes 1.0 μmole of substrate (hemicellulose) per minute at 25° C. under optimum conditions during measurement.
Galactomannanase=1:2 (w/w) solution of 1,6-α-D-galactosidase and mannan endo-1,4-β-D-mannosidase.

The following examples are intended to be illustrative of the invention:

EXAMPLE 1

A solution containing 2%(w/v) potassium chloride and 30 ppt guar or 40 ppt carboxymethyl hydroxypropyl guar was hydrated in 2.5 l of tap water for about 2 minutes. The solution was divided into 250 ml aliquots. An aliquot was mixed at 1500 rpm to get a vortex. 0.25 ml of the galactomannanase solution at an appropriate concentration of hemicellulase units/ml (HCU/ml) was added next. Then 0.25 ml of the crosslinker was added. The solution was mixed until gellation was completed. The gel was placed into a 100° F. or 170° F. water bath and monitored hourly to determine the viscosity reduction. Viscosity reduction was measured by rheological data for a dynamic break test using a Fann 50 viscometer with a spring factor of 1.0 and an R1-B1 combination. Tables I–III illustrate the effect of increasing the concentration of the enzyme breaker from one gpt of aqueous fluid to three gpt at a pH of 9.5 for guar based fluids. Tables IV and V illustrate the effect of increasing the concentration of the enzyme breaker from 0.25 gpt to 1 gpt at an acid pH for carboxymethylhydroxypropyl guar based fluids.

TABLE I

| ADDITIVES: | 30 ppt guar + 0.75 gpt 45% Potassium Carbonate + 1 gpt borate crosslinker | | | | | |
|---|---|---|---|---|---|---|
| BREAKER: | 1 gpt Galactomannanase (30,000 IHU/ml) | | | | | |
| TEMPERATURE: | 100° F. | | | | | |
| pH: | 9.5 | | | | | |
| TIME (min) | n' | k | 511 sec$^{-1}$ | 170 sec$^{-1}$ | 100 sec$^{-1}$ | 40 sec$^{-1}$ | 20 sec$^{-1}$ |

| TIME (min) | n' | k | 511 sec$^{-1}$ | 170 sec$^{-1}$ | 100 sec$^{-1}$ | 40 sec$^{-1}$ | 20 sec$^{-1}$ |
|---|---|---|---|---|---|---|---|
| 0 | 0.4417 | 0.2124 | 313 | 578 | 777 | 1296 | 1909 |
| 30 | 0.4732 | 0.1531 | 274 | 490 | 648 | 1050 | 1513 |
| 60 | 0.4956 | 0.1156 | 238 | 415 | 542 | 861 | 1221 |
| 90 | 0.5192 | 0.0901 | 215 | 365 | 471 | 732 | 1021 |
| 120 | 0.5439 | 0.0650 | 181 | 299 | 381 | 578 | 794 |
| 150 | 0.5697 | 0.0468 | 153 | 246 | 309 | 458 | 618 |
| 180 | 0.5968 | 0.0325 | 126 | 196 | 243 | 351 | 465 |
| 210 | 0.6251 | 0.0223 | 103 | 156 | 190 | 268 | 348 |
| 240 | 0.6548 | 0.0153 | 85 | 124 | 149 | 204 | 260 |
| 270 | 0.6860 | 0.0104 | 70 | 99 | 117 | 156 | 194 |
| 300 | 0.7186 | 0.0070 | 58 | 79 | 92 | 119 | 144 |
| 330 | 0.7527 | 0.0047 | 48 | 63 | 72 | 90 | 107 |
| 360 | 0.7885 | 0.0031 | 40 | 50 | 56 | 68 | 79 |
| 390 | 0.5259 | 0.0018 | 30 | 36 | 39 | 46 | 52 |
| 420 | 0.8652 | 0.0009 | 18 | 21 | 23 | 26 | 28 |
| 450 | 0.9063 | 0.0003 | 9 | 10 | 11 | 11 | 12 |

TABLE II

| ADDITIVES: | 30 ppt guar + 0.75 gpt 45% Potassium Carbonate + 1 gpt borate crosslinker | | | | | |
|---|---|---|---|---|---|---|
| BREAKER: | 2 gpt Galactomannanase (30,000 IHU/ml) | | | | | |
| TEMPERATURE: | 100° F. | | | | | |
| pH: | 9.5 | | | | | |

| TIME (min) | n' | k | 511 sec$^{-1}$ | 170 sec$^{-1}$ | 100 sec$^{-1}$ | 40 sec$^{-1}$ | 20 sec$^{-1}$ |
|---|---|---|---|---|---|---|---|
| 0 | 0.4423 | 0.2124 | 314 | 580 | 780 | 1300 | 1913 |
| 30 | 0.4781 | 0.1445 | 267 | 474 | 625 | 1009 | 1448 |
| 60 | 0.5169 | 0.0839 | 197 | 336 | 434 | 676 | 945 |
| 90 | 0.5587 | 0.0500 | 153 | 248 | 313 | 470 | 638 |
| 120 | 0.6040 | 0.0268 | 109 | 168 | 207 | 298 | 392 |
| 150 | 0.6529 | 0.0150 | 83 | 121 | 145 | 200 | 254 |
| 180 | 0.7058 | 0.0080 | 61 | 84 | 98 | 129 | 158 |
| 210 | 0.7629 | 0.0044 | 48 | 62 | 70 | 87 | 03 |
| 240 | 0.8247 | 0.0022 | 35 | 42 | 46 | 54 | 61 |
| 270 | 0.8915 | 0.0011 | 28 | 31 | 33 | 36 | 39 |
| 300 | 0.9837 | 0.0002 | 9 | 9 | 9 | 9 | 9 |

TABLE III

| ADDITIVES: | 30 ppt guar + 0.75 gpt 45% Potassium Carbonate + 1 gpt borate crosslinker | | | | | |
|---|---|---|---|---|---|---|
| BREAKER: | 2 gpt Galactomannanase (30,000 IHU/ml) | | | | | |
| TEMPERATURE: | 100° F. | | | | | |
| pH: | 9.5 | | | | | |

| TIME (min) | n' | k | 511 sec$^{-1}$ | 170 sec$^{-1}$ | 100 sec$^{-1}$ | 40 sec$^{-1}$ | 20 sec$^{-1}$ |
|---|---|---|---|---|---|---|---|
| 0 | 0.4386 | 0.2150 | 311 | 576 | 776 | 1298 | 1915 |
| 30 | 0.5293 | 0.0890 | 226 | 380 | 488 | 751 | 1041 |
| 60 | 0.5828 | 0.0443 | 157 | 249 | 311 | 455 | 608 |
| 90 | 0.6416 | 0.0216 | 111 | 164 | 198 | 275 | 353 |
| 120 | 0.7063 | 0.0101 | 77 | 107 | 125 | 164 | 201 |
| 150 | 0.7776 | 0.0046 | 56 | 71 | 80 | 98 | 114 |
| 180 | 0.8561 | 0.0020 | 39 | 46 | 50 | 57 | 63 |
| 210 | 0.9425 | 0.0008 | 28 | 30 | 31 | 33 | 34 |
| 240 | 0.9880 | 0.0002 | 11 | 11 | 11 | 11 | 11 |

TABLE IV

| ADDITIVES: | 2% KCL + 40 ppt carboxymethyl hydroxypropyl guar + 2 gpt acetic anhydride + 3 gpt 9.5% Tyzor GBA (E. I. DuPont de Nemours & Co.) by weight, 14.4% potassium acetate by weight, 2.8% aluminum acetate by weight, 73.2% methanol by volume |
|---|---|
| BREAKER: | 0.25 gpt Galactomannanase (3,000 IHU/ml) |
| TEMPERATURE: | 170° F. |
| pH: | 3.5 |

| TIME (min) | n' | k | 511 sec$^{-1}$ | 100 sec$^{-1}$ | 40 sec$^{-1}$ |
|---|---|---|---|---|---|
| 2 | .558 | .1304 | 397 | 815 | 1223 |
| 9 | .604 | .0833 | 338 | 644 | 926 |
| 15 | .612 | .0701 | 299 | 562 | 802 |
| 22 | .608 | .0613 | 255 | 483 | 692 |
| 29 | .619 | .0488 | 217 | 405 | 574 |
| 37 | .63 | .0355 | 170 | 310 | 435 |
| 44 | .655 | .0254 | 142 | 248 | 341 |
| 52 | .693 | .0159 | 113 | 186 | 246 |
| 59 | .692 | .013 | 91 | 151 | 200 |
| 63 | .711 | .0088 | 70 | 113 | 147 |
| 75 | .693 | .0079 | 56 | 92 | 122 |
| 83 | .494 | .015 | 31 | 70 | 112 |
| 90 | .582 | .0085 | 30 | 60 | 87 |
| 98 | .767 | .0025 | 29 | 42 | 52 |
| 105 | .598 | .0049 | 19 | 37 | 54 |
| 114 | .556 | .0048 | 15 | 30 | 45 |
| 120 | .638 | .0027 | 14 | 25 | 35 |
| 129 | .431 | .006 | 8 | 21 | 35 |
| 136 | .802 | .001 | 15 | 20 | 24 |
| 144 | .393 | .0065 | 7 | 19 | 33 |
| 151 | .249 | .0123 | 5 | 19 | 37 |
| 160 | .677 | .0013 | 9 | 15 | 20 |
| 166 | .324 | .0076 | 5 | 16 | 30 |
| 175 | .236 | .0105 | 4 | 15 | 30 |
| 182 | .27 | .0091 | 5 | 15 | 30 |
| 190 | .27 | .0078 | 4 | 13 | 25 |
| 197 | .139 | .0159 | 4 | 14 | 32 |
| 206 | .333 | .0054 | 4 | 12 | 22 |
| 212 | .457 | .0033 | 5 | 13 | 21 |

TABLE V

| ADDITIVES: | 2% KCL + 40 ppt carboxymethyl hydroxypropyl guar + 3 gpt 9.5% Tyzor GBA (E. I. DuPont de Nemours & Co.) by weight, 14.4% potassium acetate by weight, 2.8% aluminum acetate by weight, 73.2% methanol by volume + 2 gpt sulfuric acid 10% |
|---|---|
| BREAKER: | 1 gpt Galactomannanase (3,000 IHU/ml) |
| TEMPERATURE: | 170° F. |
| pH: | 3.75 |

| TIME (min) | n' | k | 511 sec$^{-1}$ | 170 sec$^{-1}$ | 40 sec$^{-1}$ |
|---|---|---|---|---|---|
| 2 | .446 | 70.3119 | 222 | 409 | 911 |
| 9 | .624 | 26.1678 | 251 | 379 | 654 |
| 16 | .638 | 21.0512 | 220 | 328 | 554 |
| 23 | .664 | 15.9844 | 197 | 285 | 463 |
| 30 | .64 | 15.5359 | 165 | 245 | 412 |
| 37 | .689 | 10.5426 | 152 | 213 | 335 |
| 44 | .668 | 10.0499 | 127 | 183 | 295 |
| 50 | .713 | 6.895 | 115 | 158 | 239 |
| 57 | .675 | 7.2908 | 96 | 137 | 220 |
| 64 | .73 | 4.8519 | 90 | 121 | 179 |
| 71 | .724 | 4.432 | 79 | 107 | 160 |
| 78 | .705 | 4.2817 | 68 | 94 | 144 |
| 85 | .839 | 1.9501 | 71 | 85 | 108 |
| 92 | .761 | 2.3773 | 54 | 70 | 98 |
| 99 | .737 | 2.4808 | 48 | 64 | 94 |
| 106 | .806 | 1.5058 | 45 | 56 | 74 |
| 112 | .616 | 3.2983 | 30 | 46 | 80 |
| 119 | .743 | 1.6163 | 33 | 43 | 63 |
| 126 | .619 | 2.6696 | 25 | 38 | 65 |
| 135 | .804 | .7158 | 21 | 26 | 35 |
| 142 | .684 | 1.193 | 17 | 24 | 37 |
| 149 | .614 | 1.7509 | 16 | 24 | 42 |
| 155 | .784 | .6526 | 17 | 22 | 29 |

EXAMPLE 2

Tables VI and VII which follow illustrate the retained conductivity obtained through the use of the enzyme system of the invention. The testing procedure follows a standard protocol used in the petroleum industry as described in SPE 194OZ.

TABLE VI

Proppant Pack Permeability and Conductivity at 100° F.

| Closure (psi) | Time at Stress (hrs) | Pack Width (in) | Permeability (md) | Conductivity (md-ft) | % Retained (%) |
|---|---|---|---|---|---|
| 1000 | 2 | .2323 | 718,571 | 13921.7 | 98.1 |
| 1000 | 3 | .2319 | 735,205 | 14207.8 | 100.0 |
| 1000 | 18 | .2308 | 755,000 | 14522.6 | — |
| 4000 | 1 | .2079 | 622,481 | 10786.5 | 100.0+ |
| 6000 | 1 | .1962 | 480,161 | 7849.8 | 100.0+ |

Proppant Pack: 2.0 lb/ft 20/40 Interprop Plus between Ohio Sandstone 8.0 ppg gel/proppant slurry
Fluid: 30 ppt Guar + 5.0 ppt Sodium Acetate + 0.6 gpt 45% Potassium Carbonate + 1 gpt borate crosslinker
Breaker: 1.0 gpt Galactomannanase (30,000 IHU/ml)
pH: 9.5
Shut-in Time: 12 hrs
Test Fluid: Deionized water at 100° F.

TABLE VII

Proppant Pack Permeability and Conductivity at 160° F.

| Closure (psi) | Time at Stress (hrs) | Pack Width (in) | Permeability (md) | Conductivity (md-ft) | % Retained (%) |
|---|---|---|---|---|---|
| 1000 | 1.0 | .2186 | 636,841 | 11601.1 | 86.9 |
| 1000 | 2.0 | .2181 | 642,125 | 11670.6 | — |
| 2000 | 1.0 | .2117 | 554,412 | 9780.7 | 88.0 |
| 4000 | 1.0 | .1966 | 499,814 | 8188.6 | 88.9 |
| 6000 | 1.0 | .1821 | 343,981 | 5219.9 | 91.0 |
| 6000 | 1.0 | .1813 | 347,601 | 5251.7 | — |

Proppant Pack: 2.0 lb/ft$^2$ 20/40 Interprop Plus between Ohio Sandstone core plates
Fluid: 40 ppt carboxymethyl hydroxypropyl guar + 2.0 gpt Acetic Anhydride in 2% KCl tap water + 3.0 gpt 9.5% Tyzor GBA (E. I. DuPont de Nemours & Co.) by weight, 14.4% potassium acetate by weight, 2.8% aluminum acetate by weight, 73.2% methanol by volume
Breaker: 0.75 gpt Galactomannanase (3,000 IHU/ml)
Test Fluid: Deionized Water at 160° F.
pH: 3.75

The invention has several advantages. The breaker system remains active at higher pH levels, thus alleviating the requirement of reducing the pH for enzyme activity which may interfere with the gel crosslinking time. The higher pH levels also strengthen the crosslinks in the gel, allowing for better fracturing. The higher pH levels further contribute to better proppant transport. The breaker system is active at low to moderate temperatures commonly found in subterranean formations. In addition, the fracturing fluid and method allow a controlled reduction in viscosity of the fracturing fluid so that the gelled fluid "breaks" at the conclusion of the pumping operations. These breaks produce mostly monosaccharide fragments. Cleanup of the fluid is easier since the invention produces smaller fragments which are more soluble.

While the invention has been shown in only two of its forms, it is not thus limited but is susceptible to various changes and modifications without departing from the spirit thereof.

What is claimed is:

1. A method of fracturing a subterranean formation which surrounds a well bore comprising the steps of:
    formulating a gellable fracturing fluid by blending together an aqueous fluid, a hydratable polymer, a suitable crosslinking agent for crosslinking the hydratable polymer to form a polymer gel, and an enzyme breaker;

pumping the cross-linked polymer gel to a desired location within the well bore under sufficient pressure to fracture the surrounding subterranean formations;

allowing the enzyme breaker to degrade the cross-linked polymer, whereby the fluid can be pumped from the subterranean formation to the well surface;

wherein the enzyme breaker has activity in the pH range of about 2.0 to 11.0 and effective to attack only specific linkages in the cross-linked polymer gel.

2. The method of claim 1, wherein the hydratable polymer is selected from the group consisting of guars and derivatized guars.

3. The method of claim 2, wherein the enzyme breaker is a hydrolase.

4. A method of fracturing a subterranean formation which surrounds a well bore comprising the steps of:

forming a gellable fracturing fluid by blending together an aqueous fluid, a hydratable guar polymer having repeating units of mannose and galactose linked by mannosidic and galactomannosidic linkages, a suitable crosslinking agent for crosslinking the hydratable polymer to form a polymer gel and an enzyme breaker;

pumping the cross-linked polymer gel to a desired location in the well bore under sufficient pressure to fracture the surrounding subterranean formation;

allowing the enzyme breaker to degrade the cross-linked polymer, whereby the fluid can be pumped from the subterranean formation back to the well surface;

wherein the enzyme breaker is stable within the pH range of about 2.0 to 11.0.

5. The method of claim 4 whereby the enzyme breaker has activity in the pH range of about 2.0 to 11.0, and wherein the activity is specific to attack the mannosidic and galactomannosidic linkages of the cross-linked polymer gel to reduce the polymer to a solution of mostly monosaccharide units.

6. A method of fracturing a subterranean formation which surrounds a well bore comprising the steps of:

forming a gellable fracturing fluid by blending together an aqueous fluid, a hydratable guar polymer having repeating units of mannose and galactose linked by 1,4-$\beta$-D mannosidic and 1,6-$\alpha$-D-galactomannosidic linkages, a suitable crosslinking agent for crosslinking the hydratable polymer to form a polymer gel and an enzyme breaker;

pumping the cross-linked polymer gel to a desired location in the well bore under sufficient pressure to fracture the surrounding subterranean formation;

allowing the enzyme breaker to degrade the cross-linked polymer, whereby the fluid can be pumped from the subterranean formation back to the well surface;

wherein the enzyme breaker is effective to attack the 1,4-$\beta$-D mannosidic linkage and the 1,6-$\alpha$-D-galactomannosidic linkage.

7. The method in claim 6, wherein the enzyme breaker is a 1:2 solution of 1,6-$\alpha$-D-galactosidase and mannan endo-1,4-$\beta$-mannosidase.

* * * * *